April 17, 1934.   E. J. W. RAGSDALE   1,955,438
WELDING MACHINE
Filed June 11, 1932   5 Sheets-Sheet 1

INVENTOR.
Earl J. W. Ragsdale.
BY
John P. Tarbox
ATTORNEY.

April 17, 1934.     E. J. W. RAGSDALE     1,955,438
WELDING MACHINE
Filed June 11, 1932     5 Sheets-Sheet 3

INVENTOR.
EARL J. W. RAGSDALE
BY
John P. Tarbox
ATTORNEY

Patented Apr. 17, 1934

1,955,438

UNITED STATES PATENT OFFICE 1,955,438

WELDING MACHINE

Earl J. W. Ragsdale, Norristown, Pa., assignor to Edward G. Budd Manufacturing Company, Philadelphia, Pa., a corporation of Pennsylvania Application June 11, 1932, Serial No. 616,618

10 Claims. (Cl. 219—4)

The present invention relates to electric resistance welding and particularly to a welding machine of the spot welding type, in which the welding operations of bringing the welding dies into proper engagement with the work and the application of welding current to the dies for a predetermined period of time are automatically accomplished in proper sequence upon each actuation of the machine.

An important object of the invention is the provision of a machine of the above type which may be either manually operated, or power operated to automatically produce successive welds of a uniform standard of efficiency and reliability, independently of the rate of operation of the machine so that when once set for a weld of predetermined standard, the speed of the machine may be varied to vary the rate at which the welds are made without departure from the established standard.

Another object of the invention is the provision of means for readily shifting from manual operation to power operation.

A further object is the provision of means whereby a slowing down or stoppage of the driving element at any point in the cycle of operation will have no effect on a weld being made at the time.

The above objects of the invention are attained by the use of a timing switch operable only after a predetermined extent of movement of an operating element and only to the extent of effecting the application of electrical current to the welding dies for a predetermined period of time sufficient only to make a complete weld of the type desired, and means for moving one of the welding dies into and out of engagement with the work, together with a common operating element arranged to move the operating element of the switch and the movable die in proper sequence. Means are provided for connecting the common operating element for either treadle or power operation, whereby the welds may be made individually at will and at varying intervals, or in uniform succession and at a speed limited only by the highest speed at which the work may be moved between welding periods. The sequence of movement of the welding die and switch is such that the switch is operated to effect the application of welding current only during the engagement of the dies with the work, the dies separating after each weld to permit movement of the work between successive welds. Because of the peculiar operating characteristic of the switch whereby it makes but one application of current, each for a predetermined period of time, for each operation, the time of each weld will be the same regardless of how fast or slow the machine is operated, with the result that any slowing down or stoppage of the driving element, especially as might occur under manual operation, will have no effect on the weld being made at that time.

The invention will be more readily understood from a consideration of the following detailed specification and the drawings accompanying the same.

Figure 1:
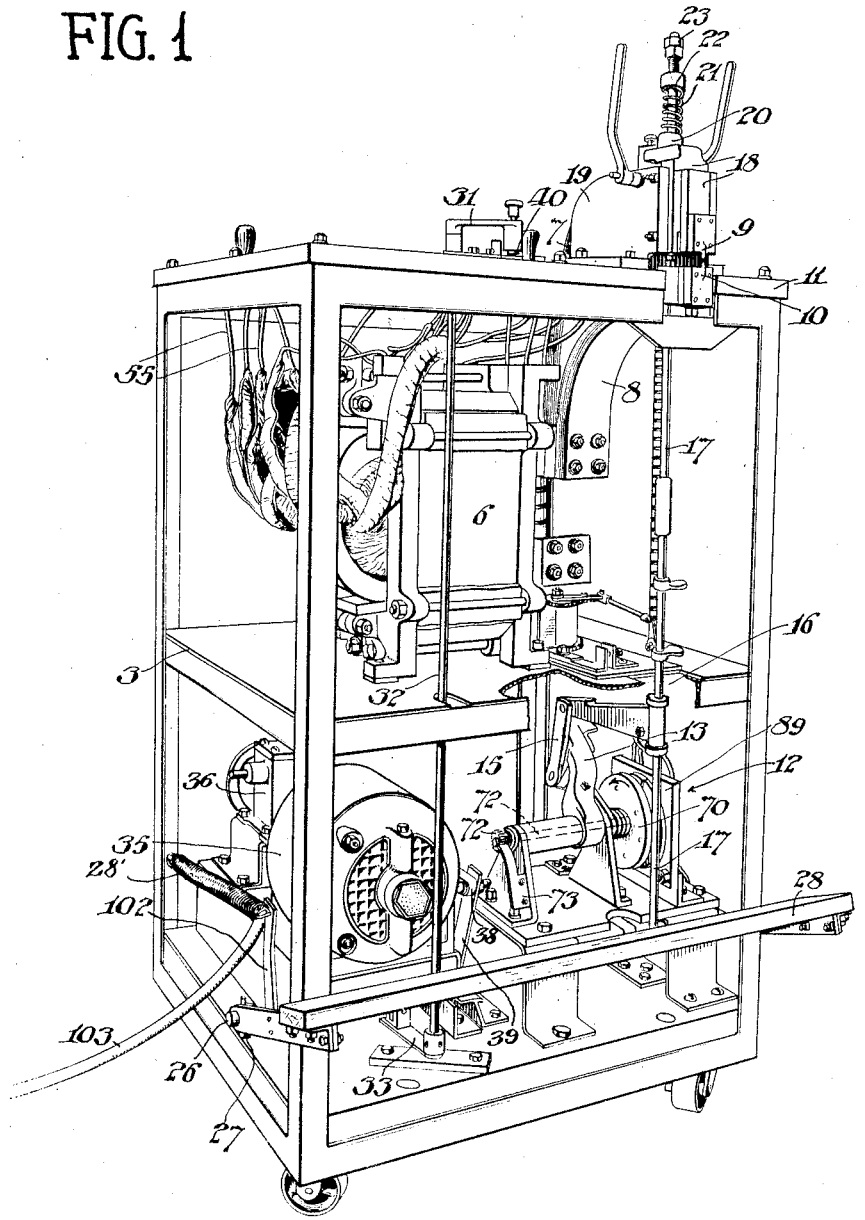
Fig. 1 is a front perspective view of the assembled device.

Referring to the drawings in detail, the apparatus comprises a main housing frame 1 mounted on casters 2 and divided by an intermediate platform 3 into upper and lower compartments 4 and 5. A welding transformer 6 is mounted on the intermediate platform 3 in the upper compartment and has its secondary leads 7—8 connected to the upper and lower welding dies 9—10, respectively, mounted on the top platform or cover 11. Mounted in the lower compartment 5 is the timing switch 12 for controlling the welding current by control of the primary circuit of the transformer. This switch, which will be described more in detail later on, is arranged to be operated by an operating lever 13 actuated through link 15 and an arm 16 by the actuating rod 17. This rod also actuates the upper or movable die 9 carried by a sliding carriage 18 slidably mounted in the stationary die head 19.

Connection is effected between the sliding carriage 18 and the rod 17 through a bearing collar 20 through which the rod slides, and a compression spring 21 engaged by a loose collar 22 in turn engaged by the lock nuts 23 secured on the rod near the top. The carriage 18 is normally held in its uppermost position indicated in Figs. 1 and 2 under the upward tension of the resilient copper leaves of the secondary lead 7 as indicated in dotted lines in Fig. 2. The rod 17 is arranged to be reciprocated up and down by the crank arm 24 carried on a driven clutch member 25 loosely mounted on a counter shaft 26. The counter shaft 26 is journaled at its ends in bearing posts 27 and is arranged to be operated by a treadle 28 normally held in the position shown by the retractile spring 28' connected to arm 102. The driven clutch member 25 is slidable on the shaft and is arranged to alternately engage the driving clutch members 29 and 30. Clutch member 29 is fixed on the counter shaft for operation by the treadle 28, while clutch member 30 is swiveled on the counter shaft for operation by motive power.

Sliding movement of the driven clutch member 25 is controlled by the clutch control lever 31, located at the top of the apparatus, through a vertical shaft 32, crank arm 33 and link 34 which latter connects to the crank arm 24 carried by the driven clutch member 25. A motor 35 mounted in the lower compartment serves as the source of motive power for the power operated clutch member 30 and is coupled thereto through a suitable speed reduction-gearing device 36, crank arm 37, link 38, and the crank arm 39 carried by the driving clutch member 30.

Figure 3:
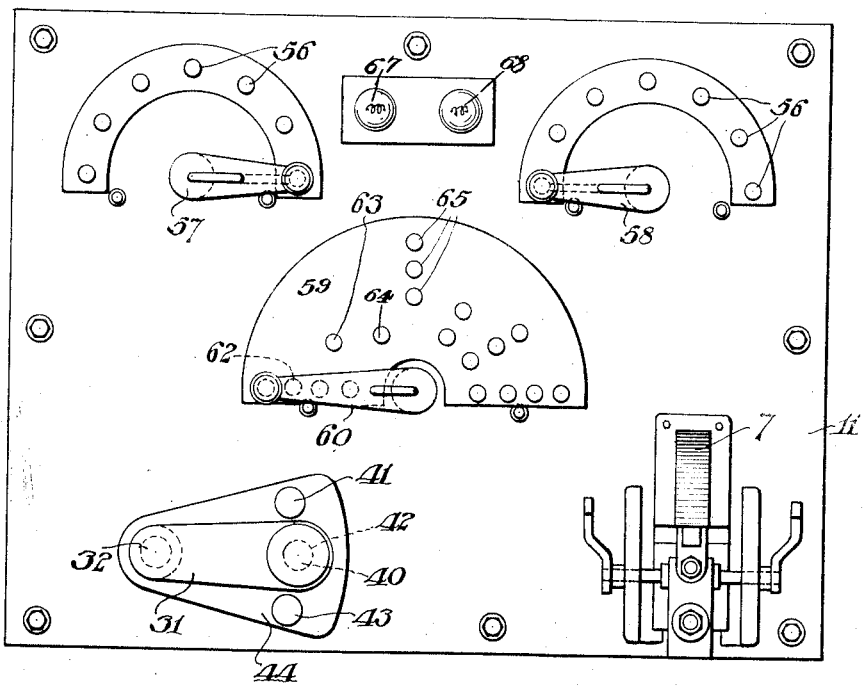
Fig. 3 is a plan view of the top portion of the device.
Figure 4:
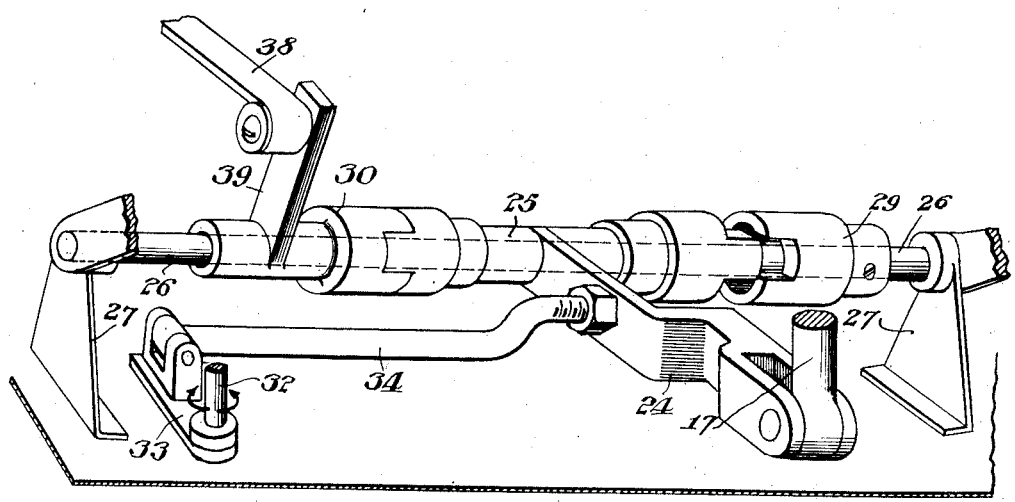
Fig. 4 is an enlarged detail view of the clutch and clutch control for shifting from manual to power operation.

For setting the shiftable, driven clutch member 25 in either of three positions, motor drive, neutral, or treadle drive, the clutch control lever 31 is provided with a spring pressed plunger 40 arranged to drop into either one of the three position determining sockets 41, 42 and 43 in the stationary segmental plate 44. Thus when the control lever 31 is moved into a position to allow the plunger to drop into socket 41 the driven clutch member 25 will be moved into and held in the power drive position in engagement with the driving clutch member 30 as shown in Fig. 4. Likewise, when the lever 31 is moved into the position shown in Fig. 3, the clutch member 25 will assume a neutral position out of engagement with both driving members 29 and 30, and when the crank 31 is moved to the position where the plunger will drop into socket 43, the sliding clutch member will be moved into and held in engagement with the treadle driving clutch member 29.

On the top of the machine are provided a pair of tap switch arms 57—58 arranged to sweep over tap terminals 56 connected through tap leads 55 leading to different points on the primary winding of the welding transformer 6. Near the center of the top panel is mounted a time adjusting switch arrangement and plate 59 comprising a switch arm 60 carrying movable contact elements 60' arranged to sweep over groups of contacts 62, 63 etc. for adjusting the time interval of the timing switch 12.

Figure 2:
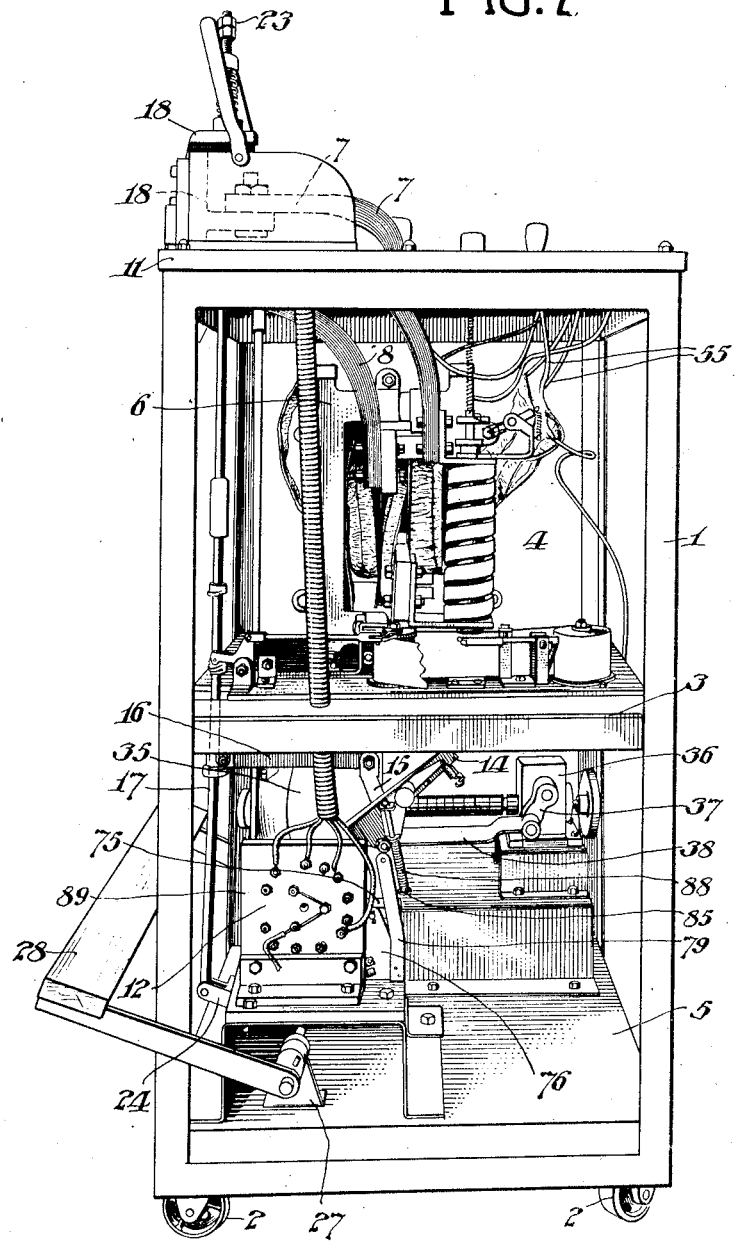
Fig. 2 is a side perspective view looking from the right of Fig. 1.
Figure 5:
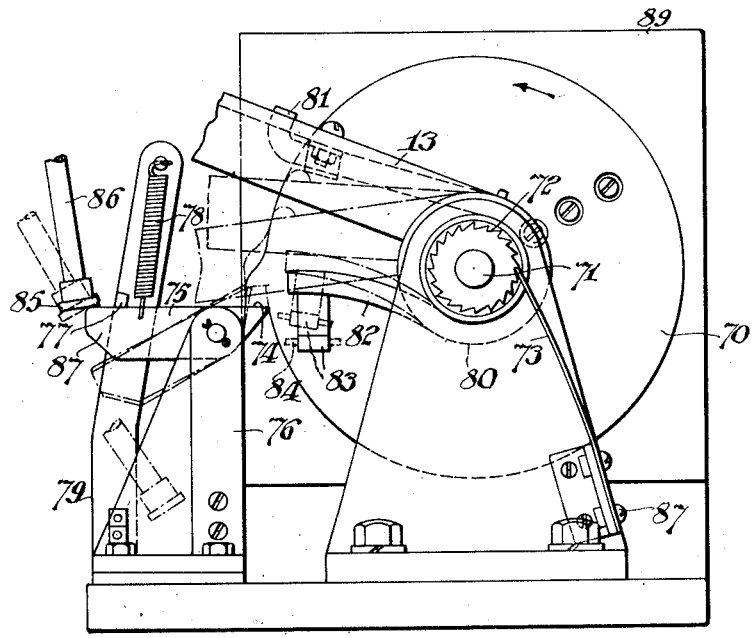
Fig. 5 is an enlarged view of the time switch operating mechanism.
Figure 6:
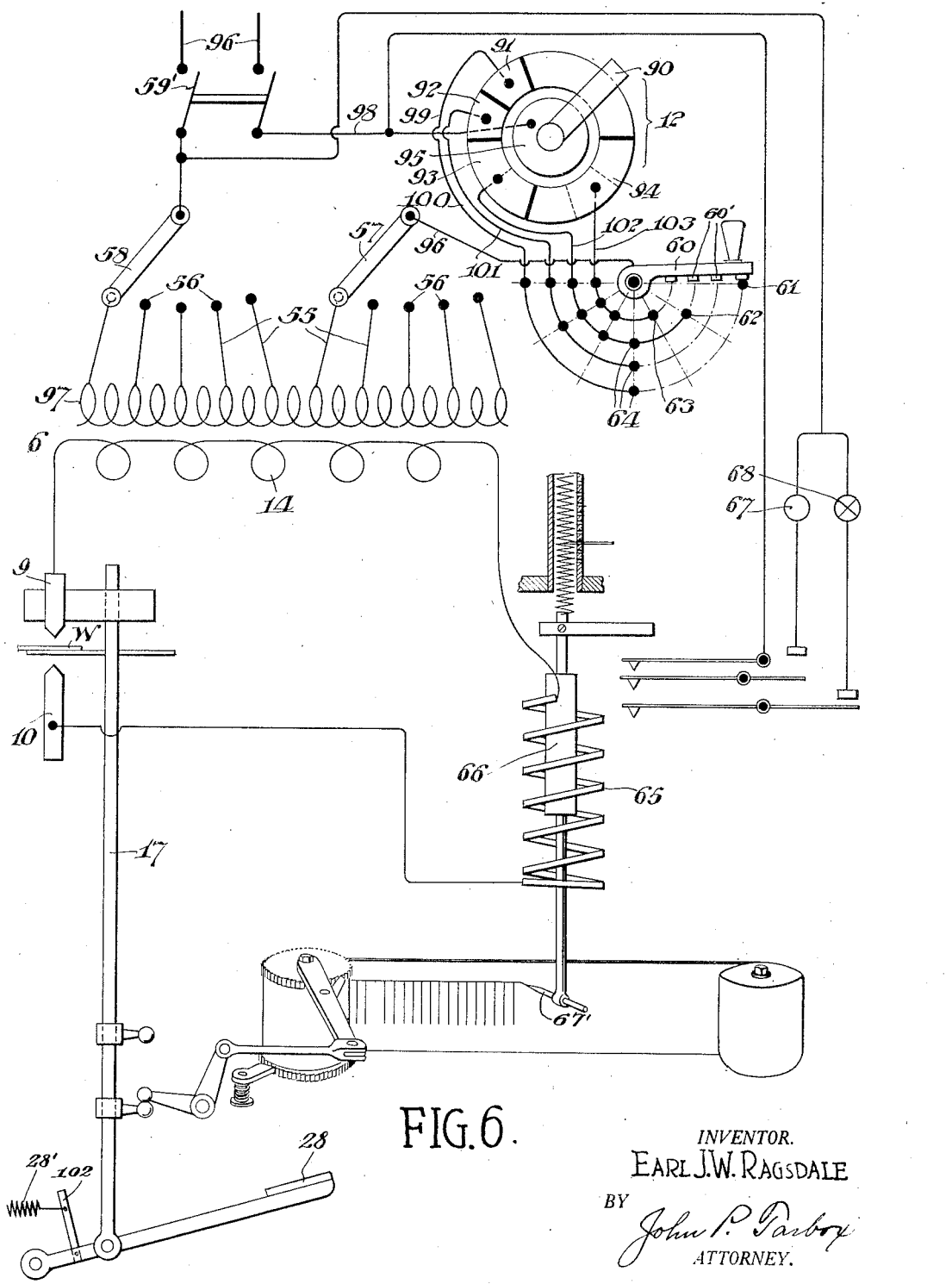
Fig. 6 is a diagram of the time switch and apparatus circuit connections.

Before describing the circuit diagram of Fig. 6 in detail, it will be well to point out the essential mechanical features and operating characteristics of the timing switch 12. The timing switch and other features of the apparatus shown and described but not herein claimed are the subject matter of copending applications. It comprises essentially a rotary member 70 in the form of a relatively heavy disk secured to a shaft 71 at the opposite end of which shaft is secured a ratchet wheel 72 engaged by a spring detent 73 to limit the rotation of the shaft to one direction only, that indicated by the arrow shown on the disk (Figs. 1 and 5). The motion of the disk is limited to one revolution for each actuation by means of a stop 74 arranged to engage a trigger element 75 pivoted on a trigger post 76 (Figs. 2 and 5) and held in normal position by a stop lug 77 under tension of a retractile spring 78 secured at its upper end to the spring support 79 (Figs. 2 and 5). Normally the disk 70 occupies the position indicated in Fig. 5 with the disk stop 74 abutting against the nose of the trigger 75. The disk is arranged to be driven by potential energy means in the form of an impelling spring 80 arranged to impart to the disk an impelling torque, which when released by the trigger, operates through the inertia of the disk to carry the disk around through a complete revolution in a predetermined length of time and back to the position where the stop 74 again engages the nose of the trigger 75. The spring 80 is coiled around the shaft 71 with one end 81 secured to the operating lever 13 and the other end 82 extended into engagement with the upper face of a pawl 83 carried by the disk. This pawl is pivoted near its lower end in an aperture 84 in the disk, is spring-pressed outwardly to normally occupy a position in the plane of the spring end 82, and is beveled outwardly from the face of the disk at its lower or pivoted end into the plane of the spring-end 82. Thus the pawl 83 is permitted to pass by the spring end 82 when carried around with the disk and again move out under the spring end when the disk comes to rest with the parts in the position shown in Fig. 6.

Potential energy is stored in the spring 80 by depression of the operating lever 13 as indicated by the two dotted line positions of the lever indicated in Fig. 5. Here it will be seen that as the lever is depressed the spring-end 82 will exert a strong downward pressure on the pawl 83 tending to rotate the disk, but that the latter is held against rotation by engagement of the stop 74 with the nose of the trigger 75. As the lever 13 is pushed down into the lowermost dotted line position the head 85 of the trip rod 86 engages the tail 87 of the trigger moving into the dotted line position and raising the stop 74 to rotate the disk slightly backward against the tension of spring 80 bringing the pawl 83 and spring end 82 into the dotted line position. From this position a slight further depression of the lever further oscillates the trigger in a counter clockwise direction out of engagement with the stop 74. The disk being now free to rotate in a counter clockwise direction, is carried by the force of the spring and its mass through one complete revolution. Immediately after the nose of the trigger leaves the stop 74 it is freed of the counter pressure of the stop thereagainst which permits the trip rod 86 to instantaneously further tilt the trigger and slide off the end thereof under tension of spring (not shown), in turn permitting the trigger to be moved into normal position under tension of spring 78. This action takes place before the disk returns to the starting position so that the nose of the trigger is in position to be engaged by the stop 74 when the disk completes its one rotation. Thus the trip rod and trigger constitute control means operable upon each actuation to effect one actuation of the timing switch, so that regardless of how slow or fast the lever 13 is operated, the disk 70 makes its one revolution always in the same given time.

The disk 70 carries a brush element arranged to sweep over a series of stationary contacts arranged in a circle on the insulating panel 89. It suffices here to refer to the circuit diagram Fig. 6 for an understanding of their arrangement and co-operative relation to the other elements of the device. As indicated in Fig. 6, the brush 90 carried by the disk 70 is arranged to normally assume the position indicated and to sweep over the circular series of stationary contacts 91 to 94 in its one revolution with the disk in the direction indicated by the arrow.

The brush 90 is arranged to successively bridge the timing contacts 91 to 94 with the plate 95 connected to the right hand side 46 of line 45 through switch 59' thus connecting that side of line successively with the contacts in its one revolution. The timing contacts are arranged to be connected with the switch element 60 in various groups of from one to four through the groups of stationary contacts 63, 64 etc. arranged to be selectively engaged by the switch element 60 each contact being connected through a suitable conductor to one of the stationary contacts of the timing switch 12. Conductor 96 extends the connection from switch element 60 to the tap switch arm 57. The other tap switch arm 58 is connected to the left side of line 47. The movable ends of the tap switch arm 57 and 58 are arranged to sweep over tap terminals 56 connected through leads 55 to different portions of the primary winding 97 of the welding transformer 6. The terminals of the secondary winding 14 of the welding transformer are connected to the welding dies 9 and 10 in series with the energizing coil 65 forming part of a welding indicator operable to indicate and record the amount of energy consumed in each weld. It suffices here to point out that it comprises in general, the energizing coil 65 operable to raise a core member 66 which in turn operates a recording stylus 67 and signals 67 and 68 respectively. The circuit of the secondary winding 14 is completed through the work W when the movable die 9 is moved down to bring the dies 9—10 into proper clamping engagement with the work. A suitable enclosure for the apparatus may be applied to the frame 1 in the form of panels and doors, which has been omitted from the drawings for the sake of a better view of the essential elements.

In operation, the length of time during which the welding current is to be applied to the welding dies for each spot weld is determined by suitable adjustment of the time adjustment switch element 60. For example, if the shortest period of time is to be used, this switch element is placed in the position shown in Fig. 6 in contact with the stationary contact 61 thus connecting the primary winding 97 of the transformer 6 with line in series with the timing switch through timing contact 91, which circuit may be traced from right side of line 46, conductor 98, plate 95, time switch brush 90, timing contact 91, conductor 99, 61, 60, 96, 57, 97, 58 and back to left hand conductor 47 of line 45. The primary of the transformer is thus normally disconnected from the line at the timing switch 12, and is closed to line only upon actuation of the switch and for the extremely short period of time required for the brush 90 to sweep over the single timing contact 91. For a longer time period the switch element 60 would be placed on contact 62 or 63 thus putting the circuit under control of one of the longer timing contacts 93, or 94, and for still longer periods the timing contacts may be grouped as for example by placing the switch element 60 on the group of stationary contacts 64 thus putting the circuit under control of the three successive timing contacts 91, 92 and 93 connected as one. The strength of the welding current is adjusted by suitable adjustment of the primary 97 of the transformer by suitable adjustment of the tap switches 57 and 58.

With the above adjustments established, the line switch 59' closed, and the driven clutch member 25 set in engagement with the treadle operated clutch member 29, the operator places the work W (Fig. 6), which may be two pieces of sheet metal to be welded together, between the welding dies 9 and 10, and presses down on the treadle 28 (Figs. 1 and 2). Downward movement of the treadle transmits a downward movement to the operating rod 17 through countershaft 26, clutch members 29 and 25, and crank arm 24 to rod 17. Downward movement of rod 17 moves the lock nuts 23 (Fig. 1) down into engagement with the loose collar 22 which in turn transmits the downward motion to the die carriage 18 and welding die 9 through compression spring 21 and collar 20. The downward motion of rod 17 continuing, brings the die 9 into resilient clamping engagement with the work piece to be welded, at the same time transmitting downward motion through arm 16 and link 15 to the operating lever 13 of the time switch 12. This movement of the lever 13 puts increasing tension on the spring 80 (Fig. 5) until further downward movement effects actuation of the timing switch control means, that is, causes the trip rod 86 to move the trigger 75 out of engagement with the stop 74 and slip off the end of the trigger, whereupon the disk 70 of the timing switch 12 and consequently the brush 90 (Fig. 6) is caused to make one revolution and stop, the time switch brush 90 sweeping over the timing contacts 91, 92 etc. The lost motion between the lock nuts 23 and the top loose collar 22 is so adjusted in relation to the resiliency of the spring 21, the movement of the die 9 necessary to bring it into engagement with the work, and the movement of the rod 17 necessary to suitably compress the spring 80, as to permit the die 9 to be brought into proper clamping relation with the work and the switch spring 80 compressed before disk 70 is released by the trigger 75.

Assuming the switch element 60 to have been placed on contact 61 the timing switch brush 90 maintains the primary circuit of the transformer closed only during its movement over the timing contact 91, which circuit may be traced from right side 46 of line 45, conductor 98, 95, 90 timing contact 91, conductor 99, 61, 60, 96, 57, 97, 58 to left hand conductor 47 of line 45. The welding circuit through the secondary of the transformer and the work may be traced from transformer secondary 14 (Fig. 6) welding die 9, work W, die 10, indicator coil 65 back to secondary 14.

The operator now permits the treadle to return normal under tension of spring 28', as indicated in Fig. 1. The return of the treadle to normal causes the rod 17 to move upward into the position shown in Fig. 1, carrying the lock nuts 23 up out of engagement with the collar 22 and permitting the carriage 18 to move upward under tension of the resilient secondary conductor 7, carrying the die 9 up out of engagement with the work. The work may now be removed or moved along between the dies for spot welding at another point. As the complete weld is made substantially instantaneously and immediately after the tripping of the trigger, it is completed before the rod 17 has time to move up and raise the die 9 from the work.

For automatic operation under power drive, the operator shifts the clutch control crank 31 to throw the driven clutch member into engagement with the power operated driving clutch member and out of engagement with the pedal operated driving member. The driving motor 35 is connected with a source of electrical power through the cable 103, whereupon the operating rod 17 is automatically, repeatedly reciprocated, motion being transmitted from the motor to the rod 17 by way of the speed reducing gearing 36 (Fig. 2), crank 37, link 38 (Figs. 2 and 4), crank 39 (Fig. 4), driving clutch member 30, driven clutch member 25 and crank arm 24 to rod 17. Each reciprocation of the rod 17 positions the welding dies on the work, tensions the spring of the timing switch and actuates the switch control means to release the switch, all in proper sequence as in the manual operation first described.

The operator has now only to feed the work along between the dies at each upward movement of the movable die, so that the possible speed of operation is limited only by the speed at which the operator can so feed the work compatible with good workmanship. Due to the fact that the speed of the timing switch is constant and independent of the rate at which successive welds are made, the speed of operation of the machine may be varied to suit different kinds of work, even to the extent of extreme irregular operation, without variation from a uniform standard quality of weld.

It will be obvious that the novel co-operative combination and relation of elements and their functional relation to each other and to the combination, which constitute the present invention may be had with substituted equivalents and in various modifications without departing from the spirit of the invention, and it is to be understood that the invention is not limited to the specific embodiment here shown and described but contemplates all such modifications and variants thereof as fall fairly within the scope of the appended claims.

What I claim is:

1. A welding machine comprising a timing switch, control means operable upon each actuation to effect only one actuation of the timing switch, manual means for directly operating said control means at will, power driven means for automatically, repeatedly operating said control means, and means for connecting individually and entirely independently of each other either said directly operating manual means or said power driven means with said control means for actuating said control means to effect the operation of said timing switch.

2. A welding machine comprising a timing switch operable at a given constant speed, control means operable upon each actuation to effect one actuation of the timing switch, and power driven means for automatically repeatedly operating said control means, the speed of operation of said switch being independent of the speed of operation of said power driven means.

3. A welding machine comprising a timing switch operable at a given constant speed, control means operable upon each actuation to effect one operation of the timing switch, a welding die movable into and out of welding position with respect to the work, common operating means for both said control means and said welding die, and power means for driving said operating means at a speed independent of the operating speed of said switch.

4. A welding machine comprising a timing switch, a welding die operable to move into and out of welding position with relation to the work, driving means for operating the timing switch, and means for automatically, repeatedly operating the welding die and the switch in unison at a rate of repetition independently of the time period of the switch.

5. A welding machine comprising a timing switch, control means operable upon each actuation to effect one complete operation of the timing switch, a welding die movable into and out of welding position with respect to the work, common operating means for both said control means and said welding die, power driving means, manual driving means, and means for connecting either the power drive or the manual drive to the said common operating means for driving the same.

6. A welding machine comprising a timing switch, manual means for operating said switch, power operated automatic means for operating said switch, and means for shifting from said manual operation to said automatic power operation for operating said timing switch and vice versa said power and manual means operating individually independently of each other to effect the actuation of said timing switch, and said timing switch operating at a constant speed independently of a variable speed of operation of either said manual or power means.

7. A welding machine comprising a timing switch, means arranged to initiate the operating cycle of said timing switch, means arranged to transfer manual or automatic cyclic activation to said first-named means, manual means arranged for co-action with said last-named means, and power means arranged for co-action with said transfer means, said transfer means arranged for pre-determined simultaneous coaction with only one of said power or manual means.

8. A welding machine comprising a timing switch, means arranged to initiate the operating cycle of said timing switch, means arranged to transfer manual or automatic cyclic operation to said first-named means, manual means arranged for coaction with said last-named means, and power means arranged for coaction with said transfer means, said transfer means arranged for pre-determined coaction with only one of said power or manual means, and said timing switch operating to control the effective energization of a welding circuit with a constant speed independently of the speed of operation of said power or manual means.

9. A welding system comprising electrodes arranged to be brought into contact with work, a welding circuit arranged to effect the energization of said electrodes, means arranged to effect the timed energization of said circuit to effective welding strength and to effectively terminate said energization, control means for said last-named means, means arranged to effect direct control through said control means for one timed welding impulse and means arranged to effect through said control means automatic repetitive timed welding impulses independently of said last named means.

10. A welding system comprising electrodes arranged to be brought into contact with work, a welding circuit arranged to effect the energization of said electrodes, means arranged to effect the timed energization of said circuit to effective welding strength and to effectively terminate said energization, control means for said last-named means, means arranged to effect direct control through said control means for one timed welding impulse and means arranged to effect through said control means automatic repetitive timed welding impulses independently of said last named means, only one of said last two named means operable at a time and the timing means operating independently of the speed of operating of said last two named means.

EARL J. W. RAGSDALE.